United States Patent [19]

Smith et al.

[11] Patent Number: 5,065,379
[45] Date of Patent: Nov. 12, 1991

[54] MEDIA INSERTION MEANS FOR AN AUTOMATED DATA LIBRARY

[75] Inventors: Stephen P. Smith; John J. Ellis, both of Rochester, N.Y.

[73] Assignee: Eastman Kodak Company, Rochester, N.Y.

[21] Appl. No.: 508,039

[22] Filed: Apr. 10, 1990

[51] Int. Cl.5 .................... G11B 17/00; G11B 17/22
[52] U.S. Cl. .......................................... 369/36; 369/30
[58] Field of Search ............... 369/36, 42, 75.1, 75.2, 369/77.1, 178, 191, 194

[56] References Cited

U.S. PATENT DOCUMENTS

| | | |
|---|---|---|
| 4,286,790 | 9/1981 | Siryj . |
| 4,502,133 | 2/1985 | Siryj . |
| 4,504,878 | 3/1985 | Gutmann ............................ 369/36 |
| 4,504,936 | 3/1985 | Faber . |
| 4,561,078 | 12/1985 | Nakayama ............................ 369/36 |
| 4,589,101 | 5/1986 | Schatteman ............................ 369/36 |
| 4,608,679 | 8/1986 | Rudy . |
| 4,614,474 | 9/1986 | Sudo . |
| 4,727,444 | 2/1988 | Fukushima ............................ 369/75.2 |
| 4,757,401 | 7/1988 | Teranishi ............................ 369/194 |
| 4,787,074 | 11/1988 | Deck . |
| 4,815,056 | 3/1989 | Toi ............................ 369/36 |
| 4,817,071 | 3/1989 | Carison . |

FOREIGN PATENT DOCUMENTS

| | | | |
|---|---|---|---|
| 0254450 | 12/1985 | Japan ............................ 369/75.1 |
| 0227260 | 9/1989 | Japan ............................ 369/191 |

Primary Examiner—Stuart S. Levy
Assistant Examiner—John C. Pokotylo
Attorney, Agent, or Firm—Robert L. Randall

[57] ABSTRACT

In an automated data library comprising a plurality of storage areas each arranged to accept and store a data storage member, a reading device arranged to retrieve data from a data storage member, and carriage means arranged to selectively transfer data storage members between the storage area and the reading device. A lever is disposed along a side of the carriage adjacent the reading and is arranged for movement between a rest portion within the perimeter of the carriage and an extended position whereby the lever engages a data storage member extending from an opening in the reading device to fully insert the member into the device.

4 Claims, 3 Drawing Sheets 5,065,379

MEDIA INSERTION MEANS FOR AN AUTOMATED DATA LIBRARY

RELATED APPLICATIONS

The present invention relates to an improved automated data library and is related to the improvements disclosed and claimed in copending applications Ser. No. 508,036, Housing Means for an Automated Data Library, and Ser. No. 508,035, Transport Drive and Support Means for an Automated Data Library, both filed in the name of Douglas L. Blanding, and Ser. No. 507,940, Media Drive for an Automated Data Library, filed in our names, all filed on even date herewith.

BACKGROUND OF THE INVENTION

Field of the Invention

The present invention is directed to apparatus for the storage and retrieval of data and information. More particularly, it relates to improvements in apparatus for transporting information storage disks, for example, magnetic, optic and magneto-optic storage disks, in a storage and retrieval device commonly referred to as an automated disk library.

Automated disk libraries, also known as "jukeboxes", are known in the art for storing and accessing a large number of data storage disks. Examples of such libraries are those disclosed in U.S. Pat. Nos. 4,286,790, 4,502,133, 4,504,936, 4,608,679, 4,614,474, 4,787,074 and 4,817,071. In such libraries, each information storage disk is housed in a protective cartridge or carrier which holds the disk and permits disk handling while permitting accessibility to the disk for data recording and/or retrieval. The disk carriers, with the associated disks, are supported by one or more storage racks which are arranged to support the disk and disk carriers in closely spaced parallel planes, for example, one above the other with the disks being disposed horizontally. Such automated disk libraries commonly include one or more disk drives for recording and/or retrieving information to or from a disk, as well as a disk carrier transport mechanism for transporting a selected carrier and disk between the storage location and the disk drive unit.

Heretofore, automated data libraries have either utilized self-loading disk drives which, after a disk carrier is partially loaded into the loading slot, draws the carrier the rest of the way into the drive, or utilized disk drives which required a sufficiently complicated loading mechanism as part of the transport carriage that it was not practical to utilize such a data library with self-loading disk drives. As a result, automated data library purchasers had to choose between self-loading disk drives, or those requiring a complicated loading mechanism, not having the option of utilizing either or both types of disk drives in a single automated data library, with the attendant loss of flexibility to the library user.

It will thus be seen that the provision of an automated disk library which provides a simple, lightweight, effective means for loading a disk carrier into a non-self-loading disk drive without the attendant cost, bulk and weight of the prior art devices would be desirable for the flexibility it would provide to automated data library users.

SUMMARY OF THE INVENTION

Accordingly, the present invention provides an automated data library comprising a plurality of storage means each arranged to accept and store a data storage member, a reading device arranged to retrieve data from a data storage member, and a carriage means arranged to selectively transfer data storage members between the storage means and the reading device. The reading device includes an opening through which a data storage member is introduced and ejected from the device, with the improvement comprising lever means disposed along a side of the carriage adjacent the reading device and arranged for movement between a rest position within the perimeter of said carriage and an extended position whereby the lever means engages a data storage member extending from the opening in the reading device to fully insert the member into the device.

The present invention further provides an automated data library having a reversible motor mounted on the carriage for moving the lever means between the rest position and the extended position.

Still further, the present invention provides an automated data library wherein the lever means is pivotally mounted on the carriage and a reversible motor mounted on the carriage, with a ring gear connected to the lever means, and a pinion gear driven by the motor engaging the ring gear to transmit motion from the motor to the lever means.

Various means for practicing the invention and other features and advantages thereof will be apparent from the following detailed description of an illustrative preferred embodiment of the invention, reference being made to the accompanying drawings.

DETAILED DESCRIPTION OF THE PREFERRED EMBODIMENT

Figure 1:
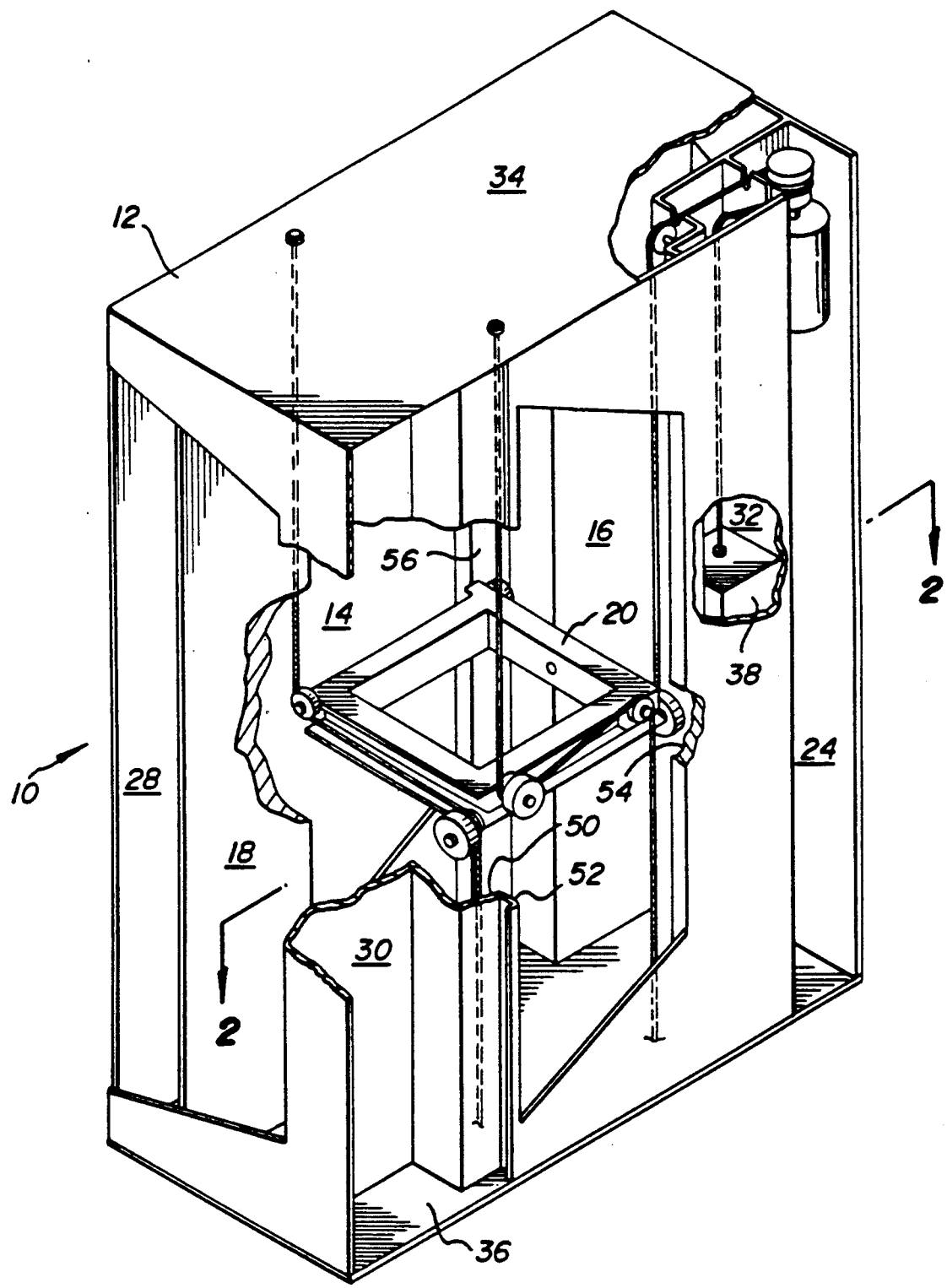
FIG. 1 is a perspective view of a preferred embodiment of the present invention illustrating an automated disk library assembly, with portions thereof cut away.
Figure 2:
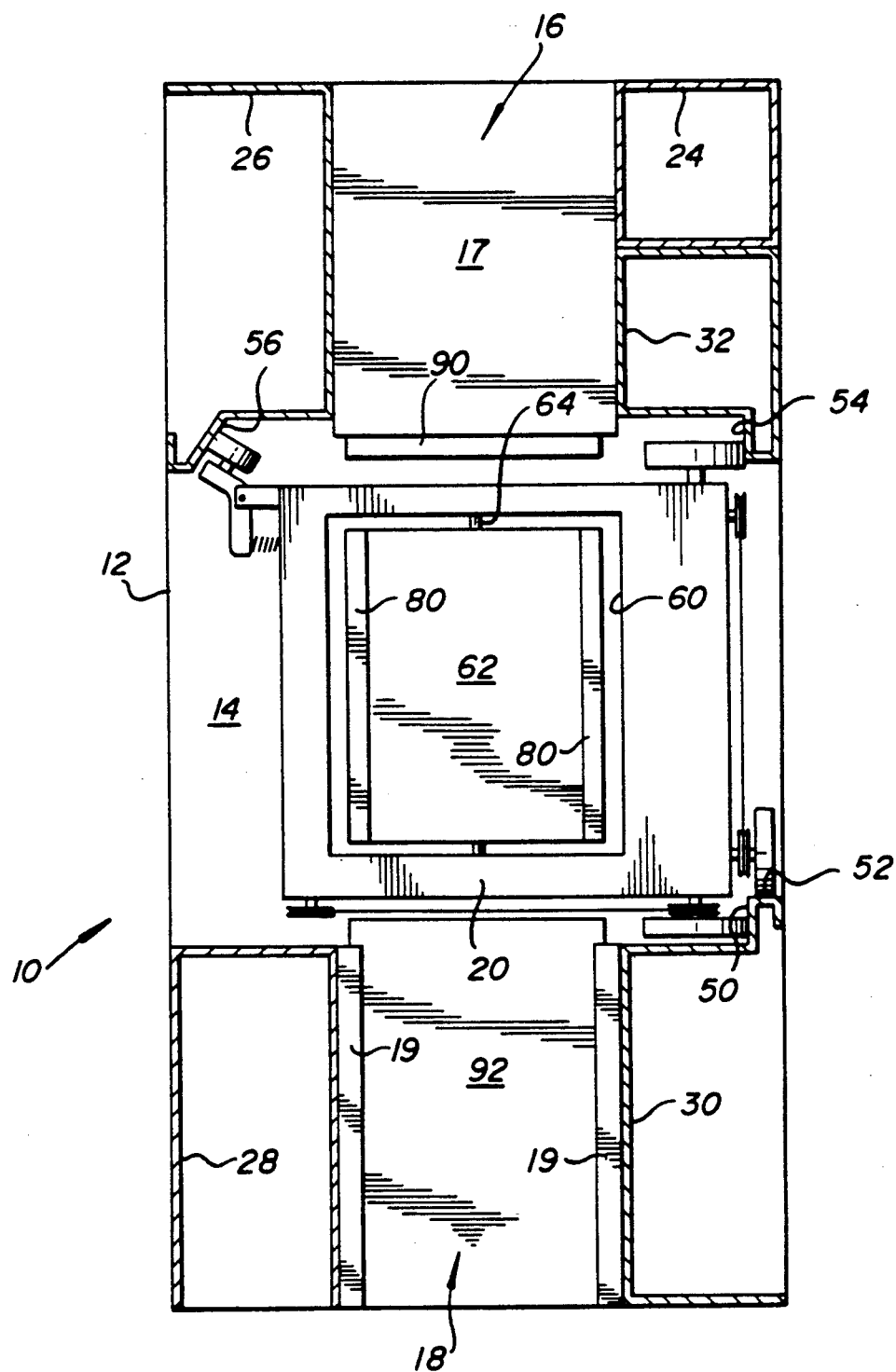
FIG. 2 is a horizontal sectional view taken through the assembly along lines 2—2 of FIG. 1.
Figure 3:
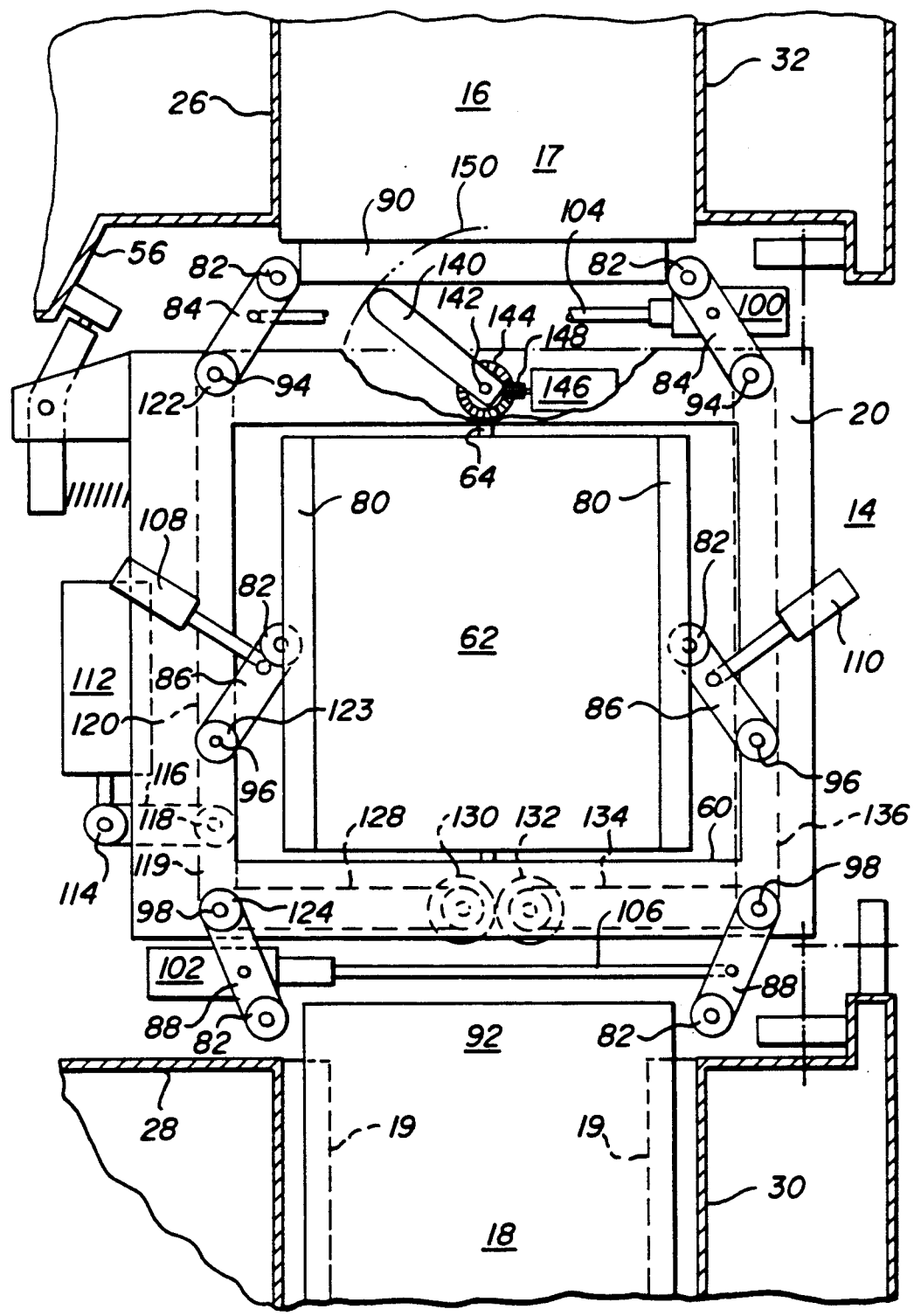
FIG. 3 is a plan view of the transport carriage, partially broken away.

Referring now to FIGS. 1, 2 and 3, a preferred embodiment of the transport drive and support means for an automated data library is illustrated. The automated data library 10 comprises a housing 12 consisting of a generally centrally disposed shaftway 14 extending vertically through the center of the housing. A pair of generally open bay areas 16 and 18 are arranged on opposite sides of, and open into the shaftway 14. The bay areas are arranged to locate and support a plurality of storage racks 19 which are each arranged to support individual disks and disk carriers 90 and 92 in closely spaced vertical stacks arranged with the disks in a horizontal plane. The storage racks are of the type commonly known in the art and are arranged to support the disks and disk carriers so as to be accessible from the shaftway 14. At least one of the bay areas is also arranged to support and locate at least one disk drive 17 arranged to receive a disk and disk carrier delivered from the shaftway, all in a manner generally known to the art. A disk transport means comprising a carriage 20 is disposed in the shaftway for vertical movement therein and for access to each of the disk carriers, with the associated disk, disposed in the storage racks within the bay areas 16 and 18 as well as to the disk drives also located therein.

The assembly housing 12 is constructed of sheet metal which has sufficient stiffness and rigidity to provide the structural integrity to withstand the forces imparted upon the assembly during assembly, shipping and operation. However, it is also constructed to provide the necessary access to the interior thereof for assembly and for service without compromising the structural integrity and rigidity thereof. This is necessary so that the forces imparted to the structure under the foregoing conditions do not deflect or distort the structure in a manner which will compromise or change the positional alignments between the various components therein so that the apparatus can operate as intended, without elaborate repositioning or readjustment necessary. The housing comprises a plurality of longitudinally extending channel members 24, 26, 28, and 30 arranged at each of the corners of the housing structure. The channel members are arranged to provide rigidity to the structure as well as mounting space for various other components of the assembly. A tubular member 32 is also provided adjacent to one corner of the assembly which, along with channel members 24–30, is structurally connected at the ends thereof to top and bottom housing plate members 34 and 36, respectively. For a more complete description of the housing, reference is made to the above-identified application Ser. No. 508,036, Housing Means for an Automated Data Library, in the name of Blanding.

The inner faces of longitudinal channel members 26, 30 and 32, i.e., those facing the shaftway 14, are provided with guide surfaces for the transport means. Channel member 30 is provided with guide surfaces 50 and 52 which are mutually perpendicular and which extend the length of the shaftway. Tubular member 32 is provided with guide surface 54 which is parallel with guide surface 50, and channel member 26 is provided with guide surface 56 which is angled with respect to guide surfaces 50, 52 and 54, in a manner to be more thoroughly described hereinbelow.

The transport carriage 20 is a substantially rectangular member disposed horizontally for vertical movement in shaftway 14. The carriage is provided with a substantially rectangular generally centrally disposed opening 60, within which a rotor 62 is mounted for rotation about a shaft 64, connecting it to the carriage 60. A means (not shown) is provided for rotating the rotor so that either side of a transported disk may be presented to the disk drive, in a manner well known in the art. The rotor 62 has a width and length substantially equal to that of the disk carrier. The carriage is provided with drive means to engage a disk carrier located in a storage device in bay 16 or 18, or in a disk drive, and to transport the disk carrier and the disk contained therein onto the rotor for transfer to another location in the assembly. The drive means of the rotor can then discharge the disk carrier to a storage location or to a disk drive.

The rotor is provided with two pairs of guide rails 80 extending along the sides of the "top" and "bottom" of the rotor 62. The guide rails have an inner spacing just greater than the thickness of the disk carrier and are spaced apart about the width of the disk carrier so that it may slide between the rails as well as be held thereby. The guide rails extend in a direction parallel to the shaft 64 of the rotor, i.e., transverse the space between the opposite bay areas 16 and 18. The guide rails are provided on both the top and the bottom of the rotor so that two disks may be carried at the same time.

The drive means provided on the carrier for engaging disk carriers comprise a plurality of resilient drive rollers 82 having a high friction outer surface and arranged at the ends of arms 84, 86 and 88, respectively. The drive rollers and the respective arms are arranged in pairs on opposite sides of the carriage and rotor and comprise three sets, with a first pair of drive rollers carried by arms 84 disposed at the first side of the carrier and arranged to engage and move a disk carrier 90 in bay area 16. A central pair of drive rollers, carried by arms 86, are disposed centrally of the guide rails 80 of the carriage 62. A third set of arms 88 are disposed at the opposite side of the carriage from arms 84 and are arranged to move a disk carrier 92 contained in the bay area 18. Each of the movable arms 84, 86 and 88 are pivotally movable on a respective shaft, 94, 96 and 98, extending vertically through the plane of the carriage. As illustrated in our copending application Ser. No. 507,940, two movable arms 86, and drive members or rollers 82, are arranged on a single shaft 96, on opposite surfaces of the carriage 20.

Each of the sets of outside arms 84 and 88 are driven by solenoids 100 and 102, respectively, the bodies of which are attached to one of the arms 84 and 88, while the armatures are connected via links 104 and 106 to the corresponding opposite arms 84 and 88 on the opposite side of the rotor 62. The central drive arms 86 are individually operated by solenoids 108 and 110.

A motor means 112 is mounted along one edge of the carriage, centrally between the top and bottom surfaces thereof and, via a suitable transmission, not shown, drives a pulley 114 which is connected by a belt 116 to a main drive pulley 118. Pulley 118 drives two belts, 119 and 120, extending in opposite directions therefrom which engage driven pulleys. The driven pulleys are drivingly connected to each of the shafts 94, 96 and 98 along that side of the carriage. The outer ends of these shafts are, in turn, connected to pulleys 122, 123 and 124 which drive the drive rolls 82 via belts and pulleys at the outer ends of the arms. Shaft 98 contains a second pulley which drives belt 128 which drives a first gear of a pair of gears 130 and 132 to reverse the belt direction on the other side of the carriage. Gear 132 drives a pulley and belt 134 which transmits the power to the opposite side of the carriage wherein belt 136 drives the pulleys mounted on the shafts 94, 96 and 98. Thus, with the single reversible motor 112, all of the drive rollers are powered whenever the motor is operated. The action of the drive rollers 82, however, is controlled by the activation of the respective solenoids so that unless the respective solenoids are activated to move the respective arms into an the drive rollers engage a disk carrier therebetween, no motion will be imparted by the drive rollers.

Thus, the operation of the drive means of the carriage is as follows: the carriage is moved to the proper vertical location within shaftway 14 to retrieve a disk carrier 90, for example from a disk drive 17 located in bay area 16, and the drive motor 112 is actuated to drive the inner faces of the drive rollers 82 (i.e., the face of each drive roller facing the center of the rotor 62) in a downward direction, as viewed in FIG. 3. Solenoids 100, 108 and 110 are then actuated to move the arms 84 and 86 into the inner, operating position, as illustrated, whereby the drive rollers 82 on arms 84 engage the edge of the disk carrier 90 and withdraw it from the disk drive 17 and propel it downward into the guide rails 80 of the rotor 62. Before the drive rollers 82 on arms 84 lose engagement with the disk carrier 90, the carrier is engaged by the drive rollers 82 on arms 86 to continue its travel until it is centered on the rotor 62 where it is stopped by detection by appropriately located sensors (not shown). Even though the drive rollers 82 on arms 88 are also being driven by motor 112, the disk carrier 92 located in the storage rack 19 in bay area 18 will not be moved because the respective solenoid 102 has not been activated so that the arms 88 and the drive rollers 82 thereon do not engage the edges of the disk carrier. The carriage is then moved along the shaftway to the desired address for the disk carrier being moved and, should it be desired to store the disk carrier in a storage rack 19 in bay area 18, solenoid 100 is inactivated and solenoids 102, 108 and 110 are actuated moving the respective arms 86 and 88 into operating position whereby the disk carrier is now driven from the rotor 62 into the storage rack 19. As previously noted, the drive rollers on the opposite surface of the carriage are also being driven simultaneously with those on the top of the carriage. However, unless the respective solenoids are actuated to move the respective arms into an operating position, the drive rollers on the lower surface will not move any disk carriers.

As noted above, prior art automated data libraries have either utilized self-loading disk drives or drives which must have the disk carrier manually inserted fully into the loading slot. Inasmuch as the non-self-loading disk drives have generally required loading mechanisms as part of the transport carriage of the automated data library which tended to increase the complexity, weight and cost of such libraries they have not been generally mixed with self-loading disk drives in an automated data library.

According to the present invention, a simple device is provided on the carriage 20, located along the edge thereof adjacent bay area 16 containing disk drive 17 for fully inserting a disk into a non-self-loading disk drive which is sufficiently simple, light-weight, and inexpensive that it can be incorporated in a library which utilizes self-loading and non-self-loading disk drives. The loading mechanism comprises a generally elongated lever means or arm 140 pivotally mounted on a vertical shaft 142 at the side of the carriage 20 adjacent the bay area containing the disk drive 17. The shaft is mounted for rotation on the carriage. A ring gear 144 is connected with the shaft 142 and thus the lever 140. A reversible drive motor 146 is mounted on the carriage and is provided with an output pinion 148 which engages the ring gear 144. The lever member 140 is arranged to be carried in an "at rest" position within the perimeter of the carriage, lying substantially parallel with the edge of opening 60 transverse to the shaft 64. When it is necessary to insert a disk carrier 90 and its associated disk into a disk drive such as 17, the carriage delivers the disk carrier into the disk drive as far as the transport rollers 82 will permit. At that point, the solenoid 100 is inactivated, retracting arms 84 and drive wheels 82 from contact with the disk carrier 90. The carriage is then moved vertically to position the lever means 140 in alignment with the edge of the disk carrier 90 and the motor 146 is actuated to swing the lever 140 through its travel, the motion of the end of the lever 140 being represented by phantom line 150. As illustrated in FIG. 3, the lever 140 is in initial contact with the end of the disk carrier 90 whereby continued motion of the lever 140 will drive the disk carrier fully into the disk drive 17. As illustrated, it is even possible for the lever means 140 to extend inside the housing of the disk drive, should that be necessary, since the dimensions of the lever are chosen to permit its entry into the loading slot of the disk drive. After the disk carrier 90 has been then seated in the disk drive, the motor 146 is reversed, returning the lever 140 to the "at rest" position within the perimeter of the carriage 20.

An alternative embodiment (not shown) provides a solenoid and appropriate linkages to drive the lever means 140 in place of the motor and the pinion and ring gear arrangement described above.

Accordingly, it will be seen that the present invention provides an actuator means mounted on the carriage for moving data-containing disks fully into a disk drive utilizing few elements. It thus provides a light, fast, simple, and inexpensive mechanism. The advantages of such a disk inserting mechanism for an automated data library are that the user can select from a wide variety of disk drives and can even mix types used in a single library to provide unprecendented versatility and flexibility of operation and use. With the present invention, this is provided without an attendant increase in complexity, cost or weight of the resulting automated data library.

The invention has been described with reference to specific embodiments and variations, but it should be apparent that other modifications and variations can be made within the spirit and scope of the invention, which is defined by the following claims.

What is claimed is:

1. In an automated data library comprising a plurality of storage means each arranged to accept and store a data storage member, a reading device arranged to retrieve data from a data storage member, carriage means arranged to selectively transfer data storage members between said storage means and said reading device, said reading device including an opening through which a data storage member is introduced and ejected from said reading device, the improvement comprising lever means disposed along a side of said carriage adjacent said reading device and arranged for movement between a rest position within the perimeter of said carriage and an extended position whereby said lever means engages an end edge of a data storage member extending from said opening in said reading device to fully insert said data storage member into said reading device, and a reversible motor mounted on said carriage for moving said lever means between said rest position and said extend position.

2. An automated data library according to claim 1 wherein said lever means is pivotally mounted on said carriage.

3. An automated data library according to claim 2 wherein a ring gear is connected to said lever means, and a pinion gear is driven by said motor and engages said ring gear to transmit motion from said motor to said lever means.

4. In an automated data library comprising a plurality of storage means each arranged to accept and store a data storage member, a reading device arranged to retrieve data from a data storage member, carriage means arranged to selectively transfer data storage members between said storage means and said reading device, said reading device including an opening through which a data storage member is introduced and ejected from said reading device, the improvement comprising lever means disposed along a side of said carriage adjacent said reading device and arranged for movement between a rest position within the perimeter of said carriage and an extended position whereby said lever means engages an end edge of a data storage member extending from said opening in said reading device to fully insert said data storage member into said reading device, and solenoid means mounted on said carriage for moving said lever means between said rest position and said extended position.

* * * * *